United States Patent
Braun

(10) Patent No.: US 7,501,614 B2
(45) Date of Patent: Mar. 10, 2009

(54) SELF-CENTERING HUB FOR TIMING DISCS OF ENCODERS, STEPPING MOTORS OR SPINNING ROLLER DRIVES

(75) Inventor: Paul-Wilhelm Braun, Troisdorf (DE)

(73) Assignee: PWB-Ruhlatec Industrieprodukte GmbH, Seebach (DE)

( * ) Notice: Subject to any disclaimer, the term of this patent is extended or adjusted under 35 U.S.C. 154(b) by 232 days.

(21) Appl. No.: 11/534,779

(22) Filed: Sep. 25, 2006

(65) Prior Publication Data

US 2007/0069594 A1    Mar. 29, 2007

(30) Foreign Application Priority Data

Sep. 26, 2005   (DE) ................. 10 2005 046 026

(51) Int. Cl.
*G01D 5/34* (2006.01)
*H01J 5/02* (2006.01)
(52) U.S. Cl. .................. 250/231.13; 250/239
(58) Field of Classification Search ........... 250/239, 250/231.11–231.18, 221; 73/460–479; 356/614–622; 359/436; 341/13, 14
See application file for complete search history.

(56) References Cited

U.S. PATENT DOCUMENTS

| | | | |
|---|---|---|---|
| 4,188,828 A | | 2/1980 | Cuccolini |
| 4,737,673 A | | 4/1988 | Wrobel |
| 4,841,297 A | * | 6/1989 | Bourgeaux et al. ............ 341/11 |
| 5,606,475 A | | 2/1997 | Ishizuka |
| 5,859,425 A | | 1/1999 | Mleinek et al. |
| 5,959,383 A | | 9/1999 | Winzen et al. |
| 6,225,721 B1 | | 5/2001 | Braun |
| 7,276,686 B2 | * | 10/2007 | Haubmann ............ 250/231.13 |

FOREIGN PATENT DOCUMENTS

| | | |
|---|---|---|
| DE | 196 41 929 | 4/1998 |
| EP | 0 468 147 | 1/1992 |
| EP | 1013951 | 6/2000 |
| GB | 1 241 455 | 8/1971 |

\* cited by examiner

*Primary Examiner*—Que T Le
*Assistant Examiner*—Pascal M Bui-Pho
(74) *Attorney, Agent, or Firm*—Nils H. Ljungman & Associates

(57) ABSTRACT

A self-centering hub, more particularly for timing discs of encoders, stepping motors, spinning roller drives and the like, comprising a hub plate for fixing timing discs or code carriers and a slotted hub shank for being slipped on to the shaft end of an input or output unit.

18 Claims, 3 Drawing Sheets

SELF-CENTERING HUB FOR TIMING DISCS OF ENCODERS, STEPPING MOTORS OR SPINNING ROLLER DRIVES

BACKGROUND

1. Technical Field

This application relates to a self-centering hub for timing discs of encoders, stepping motors or spinning roller drives, comprising a hub plate for fixing a timing disc or a code carrier, and a slotted hub shank for being slipped on to the shaft end of an input or output unit as well as an annular clamping piece form-fittingly slid on to the hub shank.

2. Background Information

From German Patent No. 19860012A1 (PWB-Ruhlatec Industrieprodukte GmbH) there is known a self-centering timing disc hub of the initially described type and a method of mounting same. Self-centering is achieved in that the outer wall of the hub shank is at least partially conical, with the cone angle rising from the shank end to the contact face of the timing disc. After the hub shank has been slipped onto the motor shaft, a clamping element, e.g. in the form of a ring, is slipped on to the cone, as a result of which the clamping effect of the slotted hub on the motor shaft is increased.

When mounting the timing disc hub care has to be taken to ensure that centering on the motor shaft takes place automatically, i.e. that it is a self-centering action. For this purpose, the hub shank, on its side facing the shaft end and the motor flange plane respectively, comprises a so-called "catching bore". Furthermore, to achieve self-centering, there is required a certain amount of play and guidance between the motor shaft and the hub shank, so that the hub cannot be pushed on to the shaft at an angle, but is centered in the conically widening catching bore.

German Patent No. 10150705A1 (Bayerische Motorenwerke AG) describes a form fitting shaft/hub connection wherein, on the outside of the hub, there is arranged a pretensioning element which permits a tensile stress of the hub in the radial direction on the shaft. The pre-tensioning element has the function of a tensioning nut and is provided with a conical inner thread. It is not shown how the pre-tensioning element is secured in the tensioned position.

German Patent No. DE19737307A1 discloses a shrinking disc for connecting a shaft and hub. It consists of a tensioning sleeve with a conical outer face and of a tensioning ring with a conical inner face, with the conical outer face of the tensioning sleeve being provided with a conical thread which is made to engage a correspondingly formed inner thread of the tensioning ring. By rotating the tensioning sleeve and the tensioning ring, the shrinking disc is tightened. One hexagon each is arranged at the tensioning sleeve and at the shrinking disc to permit the correspondingly high torque values to be applied.

The use of self-centering hubs becomes more and more common in all technical fields, so that by now, very high production numbers are achieved. Under conditions of mass production, a problem is caused by the stringent requirements to be met in respect of the surface quality of motor shafts and timing disc hubs and in respect of production accuracy to be able to observe the required tolerances. Even a slight displacement or skew position of the timing disc relative to the motor shaft is sufficient for adversely affecting the functioning of servomotors, spinning roller drives or similar sensitive applications, thus increasing the quota of rejects.

OBJECT OR OBJECTS

It is the object of at least one embodiment to develop a self-centering hub for timing discs of encoders, stepping motors or spinning roller drives with a conical clamping effect on the shafts of input or output units, which self-centering hub is placed into position without any pretension, is adjusted and secured automatically and which, even in the case of tolerance deviations and non-stringent material requirements, can be centrally slid on to and fixed to any shaft, more particularly to shaft ends on the side of the encoder. The mounting procedure is to take place under mass production conditions with the degree of accuracy required for encoders or stepping motors.

SUMMARY

In accordance with at least one embodiment, the objective is achieved by the characteristics listed in the features of the embodiments described herein. It has been found that simple rotational movements of the pinion or the clamping member generate a relative movement of the clamping piece in the axial direction of the hub, which relative movement leads to conical clamping conditions between the clamping member, the clamping piece and the hub shank.

As the hub shank is slotted, it can be slid on to the motor shaft with a slight pressure only or preferably without any pressure. The radial-symmetric design and coaxial arrangement of the hub, clamping piece and clamping member result in a self-centering effect with high clamping forces and a secure clamping fit which, even under extreme temperature changing conditions, permit undisturbed operation over several years (>10 years).

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Below, at least one embodiment of a self-centering timing disc with conical clamping conditions of the hub on the motor shaft is illustrated.

DESCRIPTION OF EMBODIMENT OR EMBODIMENTS

Figure 1:
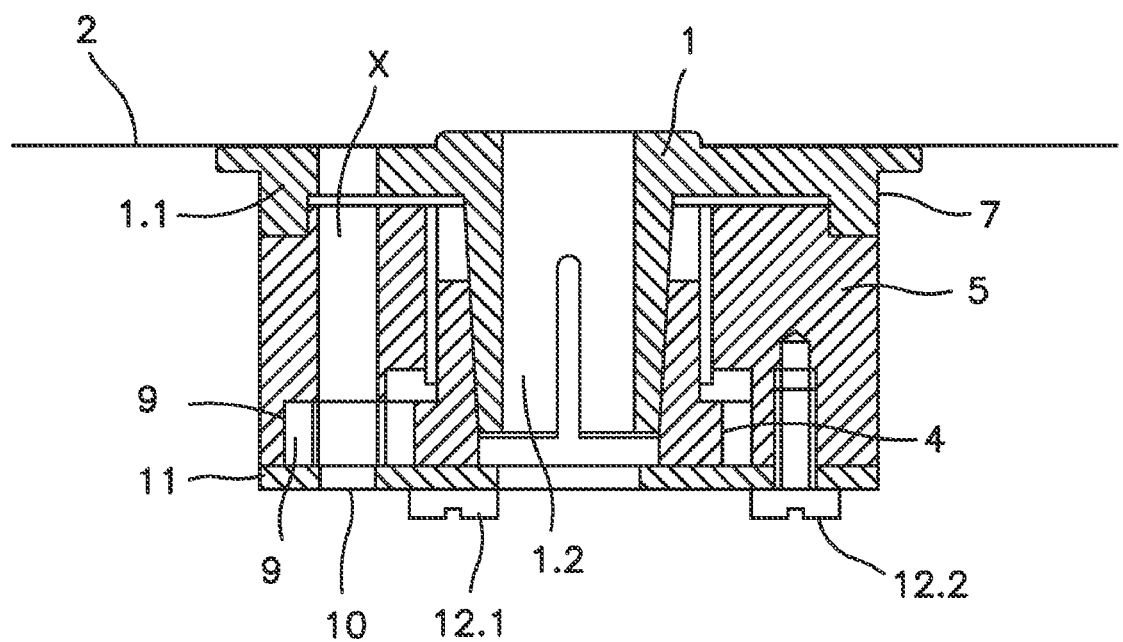
FIG. 1 is a cross-section through a self-centering hub according to at least one possible embodiment.

FIG. 1 shows the hub 1 comprising a hub plate 1.1 and a slotted hub shank 1.2. The timing disc 2 is secured to the outside of the hub plate 1.1 via an adhesive ring 3.

Figure 2:
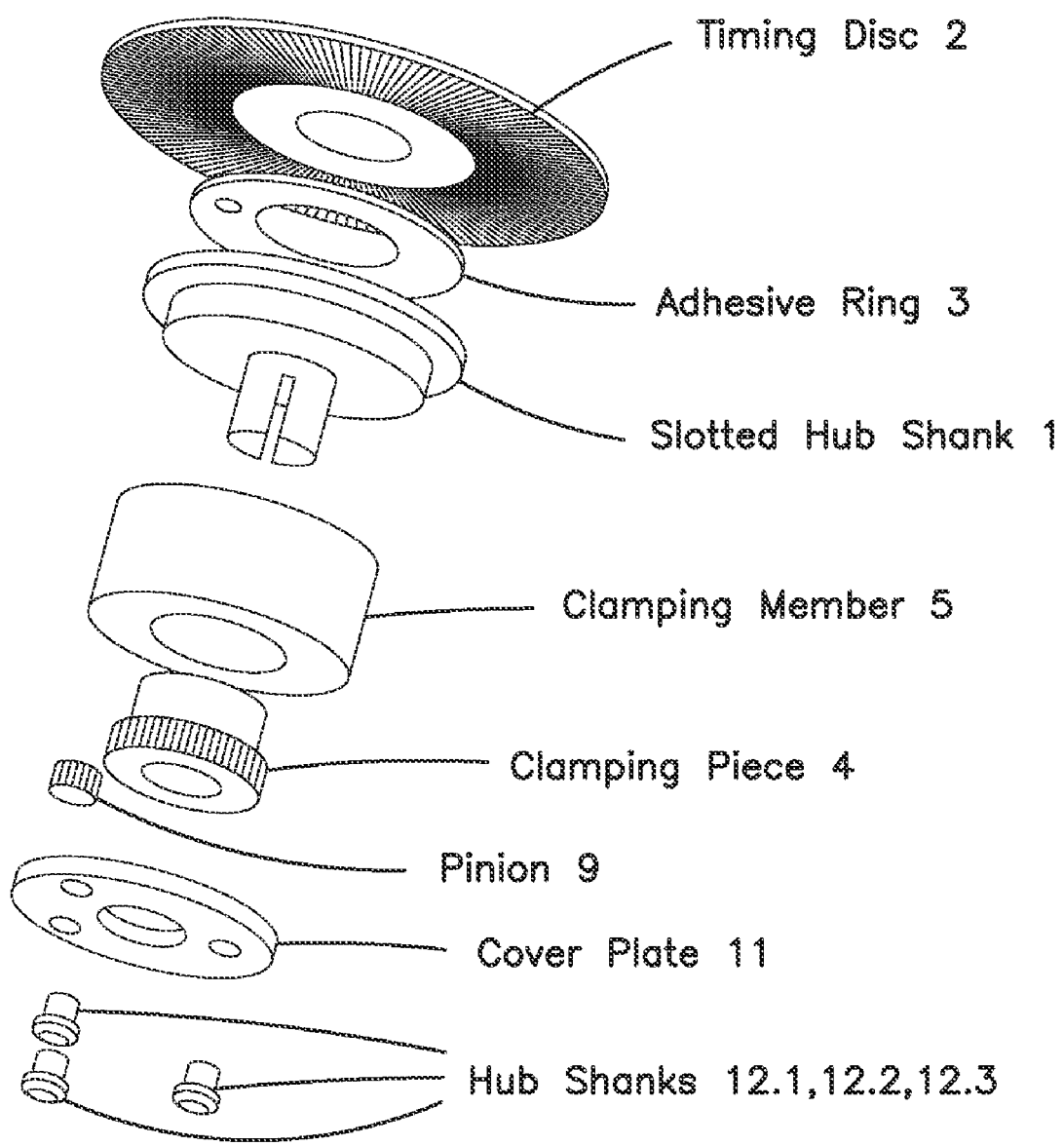
FIG. 2 is a diagrammatic illustration of the assembly sequence of a timing disc hub in accordance with at least one possible embodiment.

The hub shank 1.2 carries an outer cone on to which there has been form-fittingly slid an annular clamping piece 4. When the clamping piece 4 is displaced on the hub axis, there simultaneously occurs a self-centering and conical clamping effect with reference to the shaft end which, according to FIG. 2, can be slid into the bore of the hub.

For axially displacing the clamping piece 4, an annular clamping member 5 has been slid over the clamping piece 4 at the hub plate end facing away from the timing disc, with the centric support with reference to the hub axis 6 taking place at a continuous hub plate edge 7. Between the clamping piece 4 and the clamping member 5 there is provided a form-fitting and force-locking transfer unit 8 (see FIG. 3), for example in the form of a helical gear or a threaded connection which, via a relative movement between the clamping piece 4 an the clamping member 5, allow an axial forward movement of the clamping piece 4 towards the rising cone angle, so that there are achieved conical clamping conditions and a clamping fit accompanied by a concentrically acting self-centering effect on the motor axis.

According to FIG. 1, the relative movement between the clamping piece 4 and the clamping member 5 is preferably introduced via a pinion 9 which is rotatably arranged on an axis 10 connected to the clamping member 5. According to FIG. 1, the rigid connection between the clamping member 5 and the pinion axis 10 is achieved via a cover plate 11 which closes the annular clamping member 5 at the end facing away from the hub plate 1.1. In the embodiment according to FIG. 1, the coverplate 11 is firmly threaded by machine screws 12.1, 12.2 and 12.3 to the clamping member 5.

The pinion 9 is engaged by outer teeth 4.1 of the clamping piece 4, so that when the pinion 9 rotates around the pinion axis 10, the clamping piece 4 is also made to rotate and, in the process, because of the form-fitting connection e.g. by a thread, the transfer unit 8 and the helical teeth are caused to achieve conical clamping conditions between the motor shaft and the hub shank 1.2. The mounting of the self-centering hub and the way in which the conical clamping conditions are achieved will be described below in greater detail.

It is assumed that the shaft end at the timing disc end of the hub plate is introduced into the bore of the hub. The hub 1 is pre-mounted, but with the form-fitting and force-locking contact between the clamping piece 4 and the hub shank 1.2 being set so as to comprise play or the slightest conical clamping effect.

Pre-mounting takes place in that the clamping member 5 is slipped on to the hub plate 1.1, with the clamping piece 4 then being loosely threaded in between the clamping member 5 and the outer wall of the hub shank 1.2.

At the same time, the pinion 9 can be connected to the clamping member 5, with care having to be taken that there is achieved a play-free toothing connection between the pinion 9 and the clamping piece 4. Now, for closing purposes, the cover plate 11 is threaded by machine screws 12.1, 12.2 and 12.3 to the clamping member 5.

When sliding the shaft end along the hub axis 6, there occur only slight pressure forces. Only when the final position of the self-centering hub is achieved on the motor shaft, are the conical clamping conditions on the motor axis intensified as a result of the rotation of the pinion 9 on the pinion axis 10, as a result of which there are achieved secure holding conditions for the self-centering hub.

Figure 3:
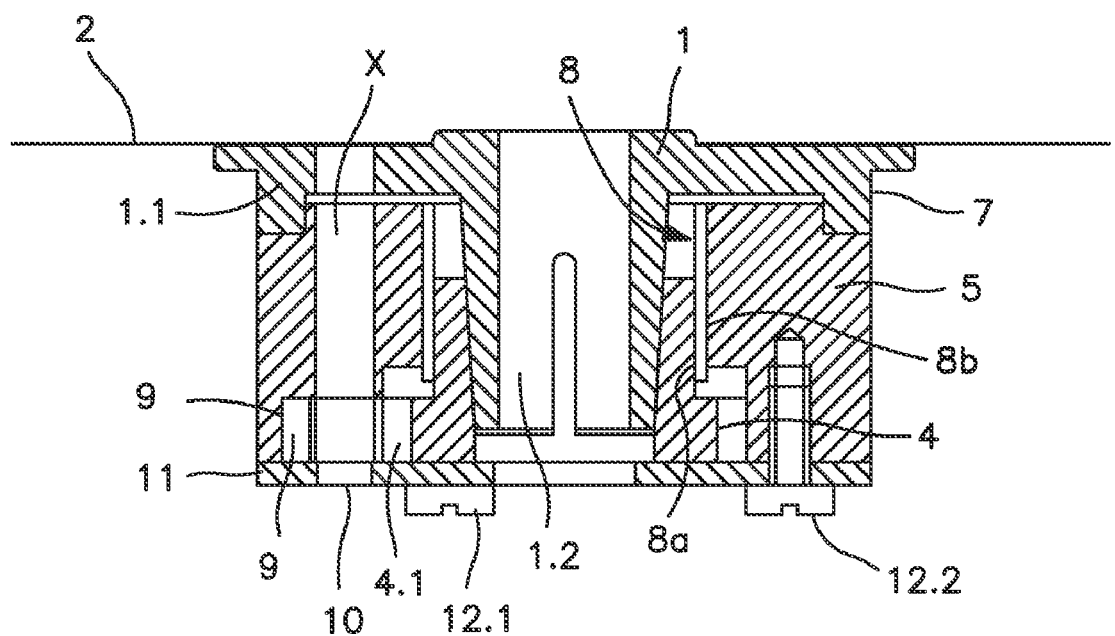
FIG. 3 is an expanded view of FIG. 1 with additional detail.

FIG. 3 shows an expanded view of FIG. 1 with additional detail. The transfer unit 8 comprises some type of toothing or engaging arrangement, such as a helical gear or screw threading. The transfer unit 8 comprises two portions 8a and 8b which matingly engage with one another. Each of the portions 8a, 8b, in at least one embodiment, are an integral part of or are attached to the clamping piece 4 and the clamping member 5, respectively. For example, portions 8a and 8b could be complementary screw-threads or helical gear toothings, which would permit the relative movement of the clamping piece 4 and the clamping member 5 toward one another upon rotation of either one or both.

According to at least one possible embodiment, there is a bore hole X which runs through the timing disc 2, the hub plate 1.1, the clamping member 5, and the cover plate 11. Each of these four components have individual holes which are aligned along a common axis 10 to form the bore hole X. The bore hole X is also aligned with the hole through the center of the pinion 9, and thereby the pinion 9 and the bore hole X share a common axis 10 about which the pinion 9 is rotated. In at least one embodiment, the bore hole X permits access to the pinion 9 from either end of the self-centering hub. As discussed above, the pinion 9 can be rotated, which in turn rotates the clamping piece 4 via an engagement between the outer teeth 4.1 of the clamping piece 4 and the pinion 9. To rotate the pinion 9, a turning device could be inserted into the pinion 9 and then turned to turn the pinion 9. The pinion 9, in at least one possible embodiment, could have an interface structure on the interior thereof for engaging with the turning device, such as mating teeth, a frictional surface, or a blade-shaped slot. The turning device could be a hand-turned device, such as a screwdriver, or a device with a drive mechanism for powered turning. Since the bore hole X is accessible from both ends of the self-centering hub, it is possible to access the pinion 9 to either tighten or loosen the self-centering hub with respect to a shaft running therethrough. In at least one other possible embodiment, the bore hole X could be a blind bore hole that is closed on either end of the self-centering hub. In yet another possible embodiment, the clamping member 5 could possibly have an opening in the outer surface thereof adjacent the pinion 9 to permit access to the teeth of the pinion 9 from the side. In such an embodiment, the bore hole X would no longer be required as the rotation of the pinion 9 could be effected by a gear or other pinion configured to matingly engage with the pinion 9.

According to one possible embodiment, in assembly of the self-centering hub prior to attachment onto a shaft, the clamping member 5 is fitted with the hub 1. The clamping piece 4 can then be relatively loosely connected to the clamping member 5 by the engagement of portions 8a and 8b. Substantially simultaneously, the clamping piece 4 engages the conical hub shank 1.2 in a friction fit to retain the hub shank 1.2 in the clamping piece 4. The pinion 9 is then inserted into a recess formed between the clamping member 5 and the clamping piece 4, which recess is disposed coaxially with the axis 10 of the bore hole X. Upon insertion, the pinion 9 is matingly engaged with the teeth 4.1 of the clamping piece 4. The cover plate 11 is then screwed on to retain the pinion 9 in the recess. The timing disc 2 is attached to the hub plate 1.1 using the adhesive ring 3 or other suitable attachment structure or material.

Once the assembly is completed, the self-centering hub is ready for attachment onto a shaft. The attachment process involves sliding the self-centering hub onto the shaft and then rotating the pinion 9, which in turn rotates the clamping piece 4. The rotation of the clamping piece 4 causes the relative movement toward one another of the clamping piece 4 and the clamping member 5. This relative movement causes the clamping piece 4 to move axially along the conical hub shank 1.2, which, due to the conical shape and the longitudinal slot therein, compresses the hub shank 1.2 and clamps the hub shank 1.2 tightly onto the shaft to center and fix the hub on the shaft. According to at least one possible embodiment, the hub plate 1.1 can be retained against the clamping member 5 during the axial movement of the clamping piece 4 either by hand or by use of a tool, or possibly by contact with components or pieces of the machine in which the hub and timing disc are being installed.

This application also relates to a self-centering hub, more particularly for timing discs of encoders, stepping motors, spinning roller drives and the like, comprising a hub plate for fixing timing discs or code carriers and a slotted hub shank for being slipped on to the shaft end of an input or output unit. The hub shank 1, 2 form-fittingly projects into an annular clamping piece 4, with the form-fitting connection between the outer hub face and the inner wall of the clamping piece 4 being such that in the case of a relative movement along the hub axis 6 between the hub 1 and the clamping piece 4 a clamping fit is formed in the region of the slotted hub shank 1, 1 via a radially inwardly directed force. The clamping piece 4 is arranged in an annular clamping member 5, with the clamping piece 4 and the clamping member 5 being form-fittingly and/or forcelockingly connected in such a way that in the case of a rotation of the clamping member 5 or the clamping piece 4, there takes place a displacement parallel to the hub axis. A cover plate 11 is fixed on to the clamping member 5, on which cover plate 11 there is rotatably supported a pinion 9 which engages outer teeth of the clamping piece 4.

One feature or aspect of an embodiment is believed at the time of the filing of this patent application to possibly reside broadly in a self-centering hub, more particularly for timing discs of encoders, stepping motors, spinning roller drives and the like, comprising a hub plate for fixing timing discs or code carriers and a slotted hub shank for being slipped on to the shaft end of an input or output unit characterized in that the hub shank 1, 2 form-fittingly projects into an annular clamping piece 4, with the form-fitting connection between the outer hub face and the inner wall of the clamping piece 4 being such that in the case of a relative movement along the hub axis 6 between the hub 1 and the clamping piece 4 there is generated a clamping fit in the region of the slotted hub shank 1, 1 via a radially inwardly directed force.

Another feature or aspect of an embodiment is believed at the time of the filing of this patent application to possibly reside broadly in the self-centering hub, wherein the clamping piece 4 is arranged in an annular clamping member 5, wherein the clamping piece 4 and the clamping member 5 are connected form-fittingly and/or force-lockingly in such a way that, upon rotation of the clamping member 5 and the clamping piece 4, there takes place a displacement parallel to the hub axis.

Yet another feature or aspect of an embodiment is believed at the time of the filing of this patent application to possibly reside broadly in the self-centering hub, wherein on to the clamping member 5, there has been fixed a cover plate 11 on which there is rotatably supported a pinion 9 which engages outer teeth of the clamping piece 4.

Still another feature or aspect of an embodiment is believed at the time of the filing of this patent application to possibly reside broadly in the self-centering hub, wherein between the clamping piece 4 and the clamping member 5, there is provided a thread in such a way that upon rotation of the clamping piece initiated via the pinion 9, there takes place a relative displacement in the axial direction of the hub between the clamping piece 4 and the clamping member 5 and thus a surface pressure in the region of the slotted hub shank 1, 2.

A further feature or aspect of an embodiment is believed at the time of the filing of this patent application to possibly reside broadly in the self-centering hub, wherein the contact face between the hub shank 1, 2 and the clamping piece 4 is conical in shape, so that in the case of a displacement of the clamping piece 4 on the hub axis 6, a radial pressure is applied to the hub shank 1, 2, so that the hub shank is clamped conically on to the shaft end.

One feature or aspect of an embodiment is believed at the time of the filing of this patent application to possibly reside broadly in a self-centering hub for timing discs of encoders, stepping motors or spinning roller drives, comprising a hub plate for fixing a timing disc or a code carrier and a slotted hub shank for being slipped on to the shaft end of an input or output unit as well as an annular clamping piece 4 form-fittingly slid on to the hub shank 1, 2, characterized in that the clamping piece 4 is arranged in an annular clamping member 5, wherein the clamping piece 4 and the clamping member 5 are connected in a form-fitting and/or force-locking way such that in the case of a rotation of the clamping member 5 or the clamping piece 4, there takes place a displacement parallel to the hub axis and wherein a cover plate 11 is fixed on to the clamping member 5, on which cover plate 11 there is rotatably supported a pinion 9 which engages outer teeth of the clamping piece 4 and, in the case of a relative movement along the hub axis 6 between the hub 1 and the clamping piece 4, a clamping fit is formed via a radially inwardly directed force in the region of the slotted hub shank 1, 2.

Another feature or aspect of an embodiment is believed at the time of the filing of this patent application to possibly reside broadly in the self-centering hub, wherein between the clamping piece 4 and the clamping member 5, there is formed a thread in such a way that, if a rotation of the clamping piece 4 is initiated via the pinion 9, there takes place a relative displacement in the axial hub direction between the clamping piece 4 and the clamping member 5 and thus a surface pressure in the region of the slotted hub shank 1, 2.

Yet another feature or aspect of an embodiment is believed at the time of the filing of this patent application to possibly reside broadly in the self-centering hub, wherein the contact face between the hub shank 1, 2 and the clamping piece 4 is conical in shape, so that, in the case of a displacement of the clamping piece 4 on the hub axis 6, a radial pressure is applied to the hub shank 1, 2, as a result of which there occurs a conical clamping action of the hub shank on the shaft end.

One feature or aspect of an embodiment is believed at the time of the filing of this patent application to possibly reside broadly in a timing disc arrangement having a central longitudinal axis, said timing disc arrangement comprising: a timing disc; a hub structure comprising a plate portion and a slotted shank portion disposed to extend from said plate portion; said timing disc being attached to said plate portion of said hub structure; said hub structure comprising a central, axial hole disposed to run through said plate portion and said shank portion and configured to receive a shaft therethrough; an annular clamping piece comprising a body portion and an annular projecting portion; said clamping piece comprising a central axial hole disposed to run through said body portion and said annular projecting portion and configured to receive said shank portion of said hub structure therein; said clamping piece being connected to said hub structure by a frictional fit between the interior surface of said clamping piece and said shank portion of said hub structure; an annular clamping member comprising a central axial hole configured and disposed to receive said clamping piece therein; said clamping member comprising an annular recess disposed about said central axial hole configured to receive said annular projecting portion of said clamping piece; said body portion of said clamping piece comprising an outer threading; said clamping member comprising an internal threading being configured and disposed to matingly engage with said outer threading of said clamping piece to connect said clamping member to said clamping piece; said threaded connection being configured to permit relative axial movement of said clamping member and said clamping piece toward and away from one another upon rotation of either one of said clamping member and said clamping piece; a pinion being disposed in said clamping member and adjacent said annular projecting portion of said clamping piece; said annular projecting portion comprising a toothed surface portion; said pinion being configured to matingly engage with said toothed surface portion of said annular projecting portion; a cover plate being attached on to said clamping member; said pinion being rotatably supported on said cover plate to permit rotation of said pinion; said pinion being configured and disposed to be rotated to thus rotate said clamping piece, and thus produce a relative axial movement of said clamping piece and said clamping member via the threaded engagement between said clamping piece and said clamping member; and said slotted hub shank being configured and disposed to be compressed by said clamping piece to clamp said hub shank onto a shaft upon axial movement of said clamping piece with respect to said hub shank disposed therein.

Another feature or aspect of an embodiment is believed at the time of the filing of this patent application to possibly reside broadly in a timing disc arrangement having a central longitudinal axis, said timing disc arrangement comprising: a timing disc; a hub structure comprising a plate portion and a slotted shank portion disposed to extend from said plate portion; said timing disc being attached to said plate portion of said hub structure; said hub structure comprising a central, axial hole disposed to run through said plate portion and said shank portion and configured to receive a shaft therethrough; an annular clamping piece comprising a body portion and an annular projecting portion; said clamping piece comprising a central axial hole disposed to run through said body portion and said annular projecting portion and configured to receive said shank portion of said hub structure therein; said clamping piece being connected to said hub structure by a frictional fit between the interior surface of said clamping piece and said shank portion of said hub structure; an annular clamping member comprising a central axial hole configured and disposed to receive said clamping piece therein; said clamping member comprising an annular recess disposed about said central axial hole configured to receive said annular projecting portion of said clamping piece; said body portion of said clamping piece comprising an outer interlocking surface; said clamping member comprising an internal interlocking surface being configured and disposed to matingly engage with said outer interlocking surface of said clamping piece to connect said clamping member to said clamping piece; said connection being configured to permit relative axial movement of said clamping member and said clamping piece toward and away from one another upon rotation of either one of said clamping member and said clamping piece; a rotatable structure being disposed in said clamping member and adjacent said annular projecting portion of said clamping piece; said annular projecting portion comprising an outer surface portion; said rotatable structure being configured to engage with said outer surface portion of said annular projecting portion; a cover plate being attached on to said clamping member; said rotatable structure being rotatably supported on said cover plate to permit rotation of said rotatable structure; said rotatable structure being configured and disposed to be rotated to thus rotate said clamping piece, and thus produce a relative axial movement of said clamping piece and said clamping member via the interlocking engagement between said clamping piece and said clamping member; and said slotted hub shank being configured and disposed to be compressed by said clamping piece to clamp said hub shank onto a shaft upon axial movement of said clamping piece with respect to said hub shank disposed therein.

Another feature or aspect of an embodiment is believed at the time of the filing of this patent application to possibly reside broadly in a timing disc arrangement, wherein: said internal interlocking surface of said clamping member comprises a screw threading; and said outer interlocking surface of said clamping piece comprises a screw threading configured to matingly engage with said screw threading of said clamping member.

Still another feature or aspect of an embodiment is believed at the time of the filing of this patent application to possibly reside broadly in a timing disc arrangement, wherein: said internal interlocking surface of said clamping member comprises a helical gear surface; and said outer interlocking surface of said clamping piece comprises a helical gear surface configured to matingly engage with said helical gear surface of said clamping member.

Yet another feature or aspect of an embodiment is believed at the time of the filing of this patent application to possibly reside broadly in a timing disc arrangement, wherein: said rotatable structure comprises a pinion; and said outer surface portion of said annular projecting portion comprises a toothed portion configured to matingly engage with said pinion.

A further feature or aspect of an embodiment is believed at the time of the filing of this patent application to possibly reside broadly in the timing disc arrangement, wherein: said hub shank comprises a substantially conical hub shank; said central axial hole of said clamping piece comprises a substantially conical hole; and said conical hole of said clamping piece is smaller than said conical hub shank such that, upon axial movement of the clamping piece toward said hub shank, a radial pressure is applied to the hub shank to thus produce a conical clamping action of the conical hub shank on a shaft.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the German Office Action dated Mar. 14, 2006, and/or cited elsewhere are hereby incorporated by reference as if set forth in their entirety herein as follows: German Patent No. 198 60 012 A1, German Patent No. 101 50 705 A1, German Patent No. 107 37 307 A1, and German Patent No. 198 60 107 A1.

The corresponding foreign patent application, namely, Federal Republic of Germany Patent Application No. 10 2005 046 026.7, filed on Sep. 26, 2005, having inventor Paul-Wilhelm BRAUN, is hereby incorporated by reference as if set forth in its entirety herein for the purpose of correcting and explaining any possible misinterpretations of the English translation thereof. In addition, the published equivalents of the above corresponding foreign patent applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A timing disc arrangement having a central longitudinal axis, said timing disc arrangement comprising:
    a timing disc;
    a hub structure comprising a plate portion and a slotted shank portion disposed to extend from said plate portion;
    said timing disc being attached to said plate portion of said hub structure;
    said hub structure comprising a central, axial hole disposed to run through said plate portion and said shank portion and configured to receive a shaft therethrough;
    an annular clamping piece comprising a body portion and an annular projecting portion;
    said clamping piece comprising a central axial hole disposed to run through said body portion and said annular projecting portion and configured to receive said shank portion of said hub structure therein;
    said clamping piece being connected to said hub structure by a frictional fit between the interior surface of said clamping piece and said shank portion of said hub structure;
    an annular clamping member comprising a central axial hole configured and disposed to receive said clamping piece therein;
    said clamping member comprising an annular recess disposed about said central axial hole configured to receive said annular projecting portion of said clamping piece;
    said body portion of said clamping piece comprising an outer threading;
    said clamping member comprising an internal threading being configured and disposed to matingly engage with said outer threading of said clamping piece to connect said clamping member to said clamping piece;
    said threaded connection being configured to permit relative axial movement of said clamping member and said clamping piece toward and away from one another upon rotation of either one of said clamping member and said clamping piece;
    a pinion being disposed in said clamping member and adjacent said annular projecting portion of said clamping piece;
    said annular projecting portion comprising a toothed surface portion;
    said pinion being configured to matingly engage with said toothed surface portion of said annular projecting portion;
    a cover plate being attached on to said clamping member;
    said pinion being rotatably supported on said cover plate to permit rotation of said pinion;
    said pinion being configured and disposed to be rotated to thus rotate said clamping piece, and thus produce a relative axial movement of said clamping piece and said clamping member via the threaded engagement between said clamping piece and said clamping member; and
    said slotted hub shank being configured and disposed to be compressed by said clamping piece to clamp said hub shank onto a shaft upon axial movement of said clamping piece with respect to said hub shank disposed therein.

2. The timing disc arrangement according to claim 1, wherein:
    said hub shank comprises a substantially conical hub shank;
    said central axial hole of said clamping piece comprises a substantially conical hole; and
    said conical hole of said clamping piece is smaller than said conical hub shank such that, upon axial movement of the clamping piece toward said hub shank, a radial pressure is applied to the hub shank to thus produce a conical clamping action of the conical hub shank on a shaft.

3. A timing disc arrangement having a central longitudinal axis, said timing disc arrangement comprising:
    a timing disc;
    a hub structure comprising a plate portion and a slotted shank portion disposed to extend from said plate portion;
    said timing disc being attached to said plate portion of said hub structure;
    said hub structure comprising a central, axial hole disposed to run through said plate portion and said shank portion and configured to receive a shaft therethrough;
    an annular clamping piece comprising a body portion and an annular projecting portion;
    said clamping piece comprising a central axial hole disposed to run through said body portion and said annular projecting portion and configured to receive said shank portion of said hub structure therein;
    said clamping piece being connected to said hub structure by a frictional fit between the interior surface of said clamping piece and said shank portion of said hub structure;
    an annular clamping member comprising a central axial hole configured and disposed to receive said clamping piece therein;
    said clamping member comprising an annular recess disposed about said central axial hole configured to receive said annular projecting portion of said clamping piece;
    said body portion of said clamping piece comprising an outer interlocking surface;
    said clamping member comprising an internal interlocking surface being configured and disposed to matingly engage with said outer interlocking surface of said clamping piece to connect said clamping member to said clamping piece;
    said connection being configured to permit relative axial movement of said clamping member and said clamping piece toward and away from one another upon rotation of either one of said clamping member and said clamping piece;
    a rotatable structure being disposed in said clamping member and adjacent said annular projecting portion of said clamping piece;
    said annular projecting portion comprising an outer surface portion;
    said rotatable structure being configured to engage with said outer surface portion of said annular projecting portion;
    a cover plate being attached on to said clamping member;
    said rotatable structure being rotatably supported on said cover plate to permit rotation of said rotatable structure;
    said rotatable structure being configured and disposed to be rotated to thus rotate said clamping piece, and thus produce a relative axial movement of said clamping piece and said clamping member via the interlocking engagement between said clamping piece and said clamping member; and
    said slotted hub shank being configured and disposed to be compressed by said clamping piece to clamp said hub shank onto a shaft upon axial movement of said clamping piece with respect to said hub shank disposed therein.

4. The timing disc arrangement according to claim 3, wherein:
said internal interlocking surface of said clamping member comprises a screw threading; and
said outer interlocking surface of said clamping piece comprises a screw threading configured to matingly engage with said screw threading of said clamping member.

5. The timing disc arrangement according to claim 4, wherein:
said hub shank comprises a substantially conical hub shank;
said central axial hole of said clamping piece comprises a substantially conical hole; and
said conical hole of said clamping piece is smaller than said conical hub shank such that, upon axial movement of the clamping piece toward said hub shank, a radial pressure is applied to the hub shank to thus produce a conical clamping action of the conical hub shank on a shaft.

6. The timing disc arrangement according to claim 5, wherein:
said rotatable structure comprises a pinion; and
said outer surface portion of said annular projecting portion comprises a toothed portion configured to matingly engage with said pinion.

7. The timing disc arrangement according to claim 4, wherein:
said rotatable structure comprises a pinion; and
said outer surface portion of said annular projecting portion comprises a toothed portion configured to matingly engage with said pinion.

8. The timing disc arrangement according to claim 3, wherein:
said internal interlocking surface of said clamping member comprises a helical gear surface; and
said outer interlocking surface of said clamping piece comprises a helical gear surface configured to matingly engage with said helical gear surface of said clamping member.

9. The timing disc arrangement according to claim 8, wherein:
said hub shank comprises a substantially conical hub shank;
said central axial hole of said clamping piece comprises a substantially conical hole; and
said conical hole of said clamping piece is smaller than said conical hub shank such that, upon axial movement of the clamping piece toward said hub shank, a radial pressure is applied to the hub shank to thus produce a conical clamping action of the conical hub shank on a shaft.

10. The timing disc arrangement according to claim 9, wherein:
said rotatable structure comprises a pinion; and
said outer surface portion of said annular projecting portion comprises a toothed portion configured to matingly engage with said pinion.

11. The timing disc arrangement according to claim 8, wherein:
said rotatable structure comprises a pinion; and
said outer surface portion of said annular projecting portion comprises a toothed portion configured to matingly engage with said pinion.

12. The timing disc arrangement according to claim 3, wherein:
said hub shank comprises a substantially conical hub shank;
said central axial hole of said clamping piece comprises a substantially conical hole; and
said conical hole of said clamping piece is smaller than said conical hub shank such that, upon axial movement of the clamping piece toward said hub shank, a radial pressure is applied to the hub shank to thus produce a conical clamping action of the conical hub shank on a shaft.

13. The timing disc arrangement according to claim 12, wherein:
said rotatable structure comprises a pinion; and
said outer surface portion of said annular projecting portion comprises a toothed portion configured to matingly engage with said pinion.

14. The timing disc arrangement according to claim 3, wherein:
said rotatable structure comprises a pinion; and
said outer surface portion of said annular projecting portion comprises a toothed portion configured to matingly engage with said pinion.

15. A self-centering hub for timing discs of encoders, stepping motors or spinning roller drives, comprising a hub plate for fixing a timing disc or a code carrier and a slotted hub shank for being slipped on to the shaft end of an input or output unit as well as an annular clamping piece (4) form-fittingly slid on to the hub shank (1, 2), characterized in that the clamping piece (4) is arranged in an annular clamping member (5), wherein the clamping piece (4) and the clamping member (5) are connected in a form-fitting and/or force-locking way such that in the case of a rotation of the clamping member (5) or the clamping piece (4), there takes place a displacement parallel to the hub axis and wherein a cover plate (11) is fixed on to the clamping member (5), on which cover plate (11) there is rotatably supported a pinion (9) which engages outer teeth of the clamping piece (4) and, in the case of a relative movement along the hub axis (6) between the hub (1) and the clamping piece (4), a clamping fit is formed via a radially inwardly directed force in the region of the slotted hub shank (1, 2).

16. The self-centering hub according to claim 15, wherein between the clamping piece (4) and the clamping member (5), there is formed a thread in such a way that, if a rotation of the clamping piece (4) is initiated via the pinion (9), there takes place a relative displacement in the axial hub direction between the clamping piece (4) and the clamping member (5) and thus a surface pressure in the region of the slotted hub shank (1, 2).

17. The self-centering hub according to claim 16, wherein the contact face between the hub shank (1, 2) and the clamping piece (4) is conical in shape, so that, in the case of a displacement of the clamping piece (4) on the hub axis (6), a radial pressure is applied to the hub shank (1, 2), as a result of which there occurs a conical clamping action of the hub shank on the shaft end.

18. The self-centering hub according to claim 15, wherein the contact face between the hub shank (1, 2) and the clamping piece (4) is conical in shape, so that, in the case of a displacement of the clamping piece (4) on the hub axis (6), a radial pressure is applied to the hub shank (1, 2), as a result of which there occurs a conical clamping action of the hub shank on the shaft end.

* * * * *